United States Patent [19]

Sakagami et al.

[11] Patent Number: 4,910,724
[45] Date of Patent: Mar. 20, 1990

[54] INFORMATION RECORDING MEDIUM HAVING AN AREA FOR RECORDING INFORMATION INDICATING LOGICAL ERASURE OF DATA AND METHOD FOR RECORDING INFORMATION

[75] Inventors: Wataru Sakagami; Yutaka Ogasawara, both of Yokohama, Japan

[73] Assignee: Canon Kabushiki Kaisha, Tokyo, Japan

[21] Appl. No.: 372,168

[22] Filed: Jun. 27, 1989

Related U.S. Application Data

[63] Continuation of Ser. No. 93,229, Sep. 4, 1987, abandoned.

[30] Foreign Application Priority Data

Sep. 10, 1986 [JP] Japan ................... 61-211728
Oct. 7, 1986 [JP] Japan ................... 61-237033

[51] Int. Cl.$^4$ ................................. G11B 7/00
[52] U.S. Cl. ........................... 369/100; 369/55
[58] Field of Search ................... 369/55, 54, 100

[56] References Cited

U.S. PATENT DOCUMENTS

| | | | |
|---|---|---|---|
| 4,308,557 | 12/1981 | Dieterich | 369/53 X |
| 4,309,721 | 1/1982 | Christopher | 369/53 X |
| 4,497,050 | 1/1985 | Beetstra | 369/59 |
| 4,519,058 | 5/1985 | Tsurushima et al. | 369/53 |
| 4,545,044 | 10/1985 | Satoh et al. | 369/32 |
| 4,742,507 | 5/1988 | Kuroki et al. | 369/54 |

FOREIGN PATENT DOCUMENTS

| | | |
|---|---|---|
| 0072704 | 2/1983 | European Pat. Off. |
| 0165382 | 12/1985 | European Pat. Off. |
| 0022274 | 3/1981 | Japan |
| 0078639 | 5/1982 | Japan |
| 0279957 | 12/1986 | Japan |

OTHER PUBLICATIONS

Proceedings of the International Conference on Data Engineering, Los Angeles, 1984, pp. 175–180, IEEE, New York; P. Rathmann; Dynamic Data Structures on Optical Disks.

*Primary Examiner*—William L. Sikes
*Assistant Examiner*—Akm E. Ullah
*Attorney, Agent, or Firm*—Fitzpatrick, Cella, Harper & Scinto

[57] ABSTRACT

There is disclosed an information recording medium having an area for recording data and an area for recording a directory used to manage the recorded data, by providing an area for recording information indicating logical erasure of the unnecessary data. In the information record method of the present invention, when unnecessary data is produced, information indicating the logical erasure of the data is recorded in the area of the information record medium in which the directory is recorded.

6 Claims, 4 Drawing Sheets

INFORMATION RECORDING MEDIUM HAVING AN AREA FOR RECORDING INFORMATION INDICATING LOGICAL ERASURE OF DATA AND METHOD FOR RECORDING INFORMATION

This application is a continuation-in-part continuation of application Ser. No. 093,229 filed Sept. 4, 1987, now abandoned.

BACKGROUND OF THE INVENTION

1. Field of the Invention

The present invention relates to an information record medium having a data record area and an area for recording a directory used for managing the recorded data, and a method for recording information on such a medium.

2. Related Background Art

Floppy disk and magnetic hard disk which magnetically record and reproduce information, a cardshaped optical information record medium (optical card) for optically recording and reproducing information, and a disk type optical information record medium (optical disk) have been known as the information record media.

In order to store a large amount of data on such an information record medium, auxiliary data or so-called directly for managing data block by block is used. File information such as file names, file lengths and leading data track numbers are usually written into the directory to manage the data files.

The optical card has a large recording capacity although it is as large as a credit card. The size of the credit card is approximately 85 mm×55 mm. Assuming that an information track pitch is 20 μm and one-bit record length is 5 μm;
the number of tracks is 55×(1000÷20)=2750 tracks
bit capacity/track is 85×(1000÷5)=17000 bits
byte capacity/track is 17000÷8=2000 bytes
Accordingly,
total data capacity is 2750×2000=5500000 =5.5 MB In order to manage such a large amount of information, information management by the directory is essential.

Such a directory is disclosed in U.S. patent application Ser. No. 699,801 filed on Feb. 8, 1985 and assigned to the assignee of the present invention, and U.S. patent application Ser. No. 064,246 filed on June 19, 1987 and also assigned to the assignee of the present invention.

On the other hand, when data recorded on the information record medium is no longer necessary, the unnecessary data and the corresponding directory may be physically erased if the recording medium is erasable such as the magnetic disk. However, in the optical card and optical disk, such physical erasure cannot be attained and the necessary data and unnecessary data mixedly exist on the medium. This causes the data management complex.

In order to solve the problem, it may be possible to irradiate a high intensity light beam on to areas in which the data and directory to be erased are recorded to destroy those areas. However, in this method, the destroyed areas and other defect areas cannot be distinguished when the data is read. As a result, the destroyed area may be judged as an error and the retry may be repeated. This impedes a normal read operation.

SUMMARY OF THE INVENTION

It is an object of the present invention to provide information record medium and information record method which solve the problems encountered in the prior art and allow easy data management when a portion of data is no longer necessary.

The above object of the present invention is achieved in an information record medium having an area for recording data and an area for recording a directory used to manage the recorded data, by providing an area for recording information indicating logical erasure of the unnecessary data. In the information record method of the present invention, when unnecessary data is produced, information indicating the logical erasure of the data is recorded in the area of the information record medium in which the directory is recorded.

DETAILED DESCRIPTION OF THE PREFERRED EMBODIMENTS

The information record medium and information record method of the present invention will be explained with reference to an optical card.

Figure 1:
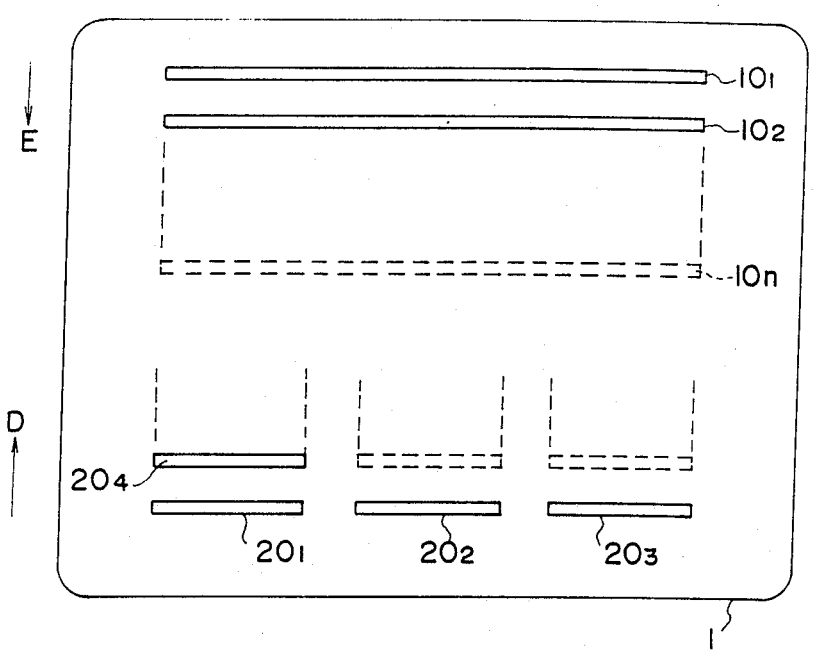
FIG. 1 shows a plan view of one embodiment of an information record medium of the present invention.

FIG. 1 shows a plan view of one embodiment of the information record medium of the present invention. The optical card 1 has a data area 10 comprising data tracks (101, 102, ..., 10n) and a directory area 20 (201, 202, ..., 20n). Data is written into the data area 10 from the top of the optical card in a direction E, and directory information which is data management information is written into the directory area 20 from the bottom of the optical card 1 in a direction D.

Figure 2:
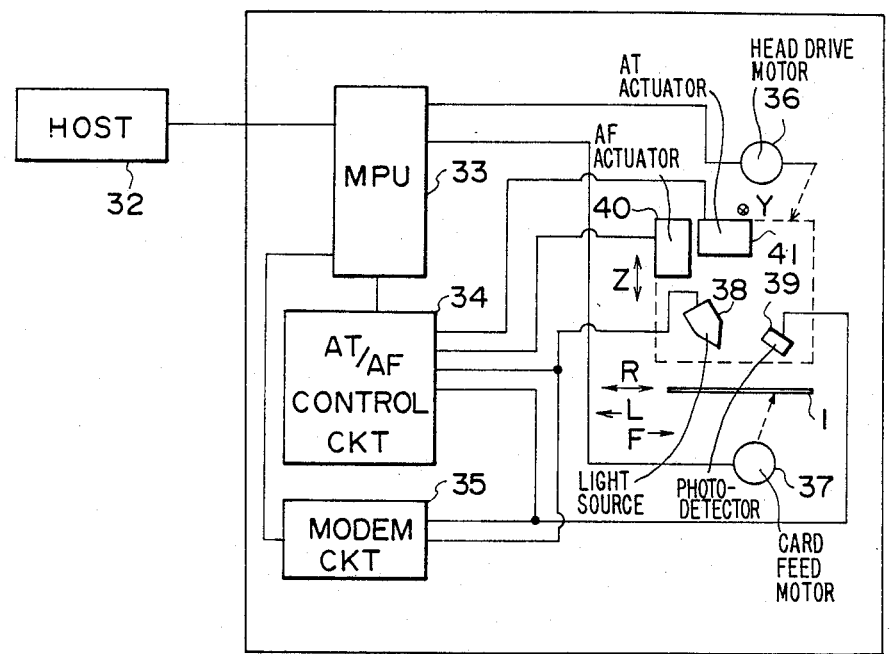
FIG. 2 shows an embodiment of an information recording and reproducing apparatus in accordance with the present invention.

FIG. 2 shows a configuration of an apparatus for recording and reproducing information to and from the optical card 1. The information recording and reproducing apparatus (drive) 31 is connected to a host control unit (host) 32 and data communication and control are effected between the drive 31 and the host 32. A microprocessing unit (MPU) 33 in the drive 31 includes a read-only memory (ROM) and a random access memory (RAM) and primarily controls a card feed motor 37 and a head drive motor 36. An auto-tracking/auto-focusing (AT/AF) control circuit 34 receives a signal from a photo-detector 39 to drive an AF actuator 40 and an AT actuator 41. A modem 35 records information by modulating a light intensity of a light source 38 in a record mode, and demodulates the data based on the signal from the photo-detector 39 in a reproduce mode. The host 32 communicates the data with the drive 31 and controls record and reproduce operation of the information of the directory area and data area on the optical card 1.

Figure 3:
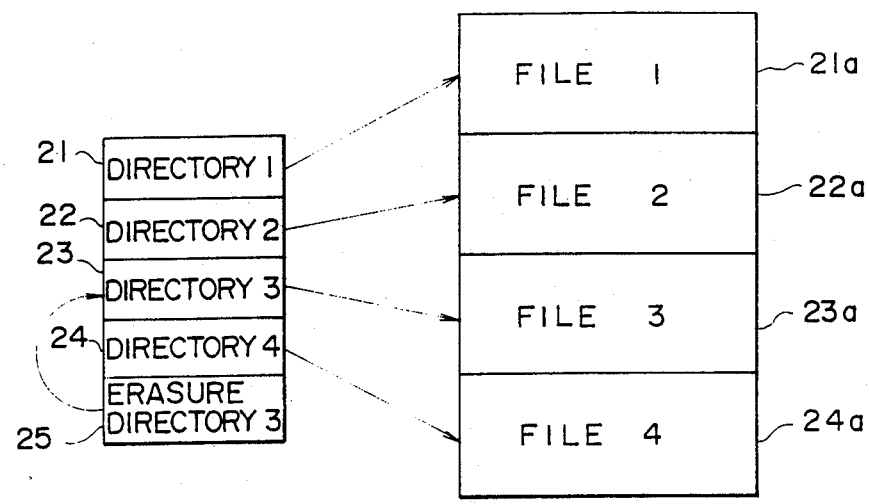
FIG. 3 illustrates file management of a medium on which information is recorded in accordance with the present invention.

FIG. 3 illustrates the file management by the directory in accordance with the information record method of the present invention.

Numerals 21 to 25 denote directory areas and numerals 21a to 24a denote data areas. Directory information of files 1-4 of the data areas 21a-24a, are written in the directories 1-4 of the directory areas 2-24, respectively. Assuming that the file 3 is no longer necessary, an erasure directory 3 indicating that the file 3 is unnecessary is written into the directory area 25. The erasure directory 3 includes information indicating that the directory is the erasure directory and information indicating the directory of the file to be erased. In the present example, the information of the directory 3 is written as the directory of the file to be erased. Thus, the file 3 is logically erased.

The reproduction of the information from the optical card having the erasure directory recorded thereon is now explained.

Figure 4:
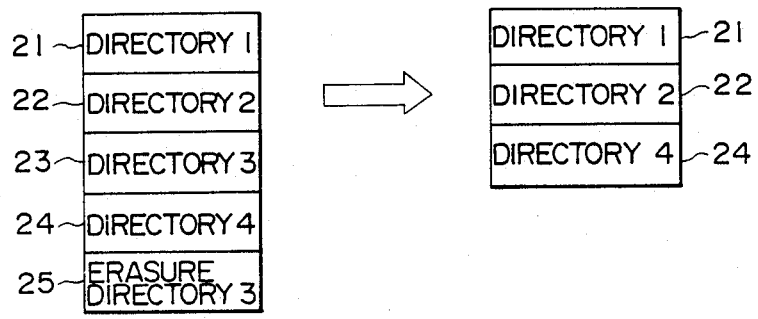
FIG. 4 illustrates reproduction of information from the medium on which information is recorded in accordance with the present invention.

FIG. 4 illustrates the reproduction from the optical card. Directory areas 21-25 have the directories 1-4 and erasure directory 3 recorded thereon. The directory areas 21-25 are read by the information recording and reproducing apparatus shown in FIG. 1 and all or necessary portion (directory information of the directory areas 21-25 in the present embodiment) of the directory information of the directory areas are read into the RAM of the host 32 or an auxiliary storage. The host 32 removes the directory 3 designated by the erasure directory 3 from the directory information read into the RAM or auxiliary storage, and reads into the directories 1, and 4. Thereafter, the directories 1, 2 and 4 are used to manage the files.

The erasure directory may be of any one of various formats. For example, an area to record the erasure information may be provided in the directory area so that the directory is distinguished from the erasure directory. This is explained below.

Figure 5:
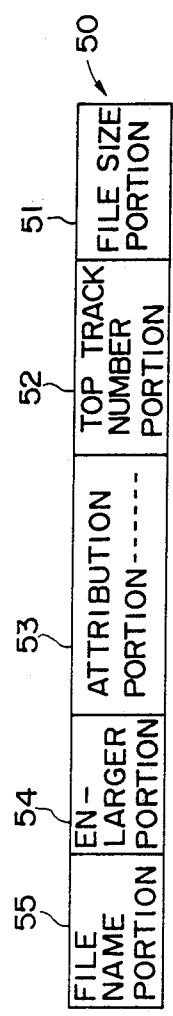
FIG. 5 shows an example of a directory format of the medium of the present invention.

FIG. 5 shows an example of a directory format. The directory 50 comprises a file name field 55, an extension field 54, an attribute field 53, a leading track number field 52 and a file size field 51.

A characteristic portion of the directory format of the present invention is in the leading track number field 52.

Figure 6:
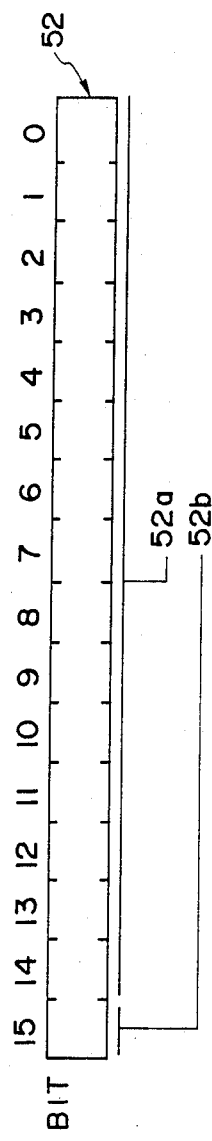
FIG. 6 shows an enlarged view of a leading track number field shown in FIG. 5, and FIGS. 7A, 7B and 8 illustrate advantages offered by using the information record medium of the present invention.

FIG. 6 shows the leading track number field. Bits 0 to 14 are used as a leading track number record field 52a and a bit 15 is used for a delete bit 52b which indicates whether the file has been erased or not.

Figure 7A:
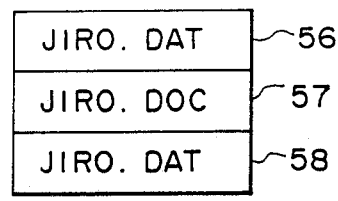
Figure 7B:
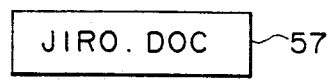

The file management by the above directory format is explained below. It is assumed that the "0" delete bit 52b indicates a valid file and the "1" delete bit 52b indicates an erased file, and that when all directories are read, there are three directories 56, 57 and 58 which have file names and extensions of JIRO·DAT; JIRO·DOC; and JIRO·DAT, respectively, as shown in FIG. 7A. The respective directory bits 52b are examined. If the delete bit of the directory 56 (file name JIRO, expander DAT) is "0" and the delete bit of the directory 58 (file name JIRO, expander DAT) is "1", it is determined that the file JIRO·DAT has been erased and the available file is only JIRO·DOC as shown in FIG. 7B. In this case, the leading track number of the directory 56 is same as the leading track number of the directory 58.

Following to FIG. 7A, the file having the file name JIRO and the extension DAT is additionally recorded and a directory 59 is provided. Since the leading track number of the additional record is different from the directory 56 (file name JIRO and expander DAT), only the additionally recorded file JIRO·DAT can be made effective.

Figure 8:
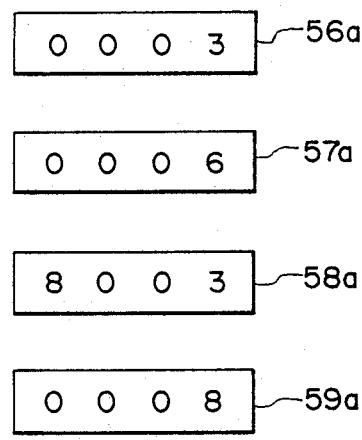

The additional record is specifically explained with reference to FIG. 8.

Assuming that the file JIRO·DAT (JIRO·DAT-1) is recorded from the third track, and the additional file JIRO·DAT (JIRO·DAT-2) is recorded from the eighth track, the track number field 56a of the directory 56 of JIRO·DAT-1 is 0003 (hexadecimal), the track number field 58a of the directory 58 of JIRO·DAT-1 is 8003 (hexadecimal), and the track number 59a of the directory 59 of the added JIRO·DAT-2 is 0008 (hexadecimal).

In the present embodiment, the leading track number is represented by two bytes although it may be represented by one byte or more than three bytes.

In the present invention, since the information indicating the logical erasure of unnecessary data is recorded in the directory area, the directory of the unnecessary data can be eliminated in the system. Accordingly, only the directories of necessary data are read into the host so that the number of directories is reduced and the data retrieval is simplified and speeded up.

In the present invention, the logical erasure file can be read by providing a special processing routine different from a normal directory processing so that a backup in the file processing is obtained.

The present invention may be modified differently from the illustrated embodiment and it covers all such modifications without departing from the scope of claims.

What we claim is:

1. A method for recording information on an information recording medium comprising a first area for recording data and a second area for recording at least one directory used to manage the data, said method comprising the steps of:
   recording data on the first area of the medium;
   recording a first directory on the second area of the medium corresponding to the data on the first area; and
   recording a second directory in an unrecorded portion of the second area to indicate logical erasure of the data when the data is no longer needed.

2. A method according to claim 1, wherein one of the first and second directories has a mark to make the first and second directories distinct from each other.

3. A method according to claim 2, wherein the mark comprises a delete bit.

4. A method according to claim 3, wherein the first and second directories include address portions indicating the position of the data in the first area, and the delete bit is in the address portion of the one directory.

5. A method according to claim 1, wherein the first and second directories each include a file name for the data.

6. A method according to claim 1, wherein a plurality of two-ended tracks are formed parallel on the medium and wherein the data is recorded form one end of one of the plurality of tracks and the directory is recorded from the other end of the one track.

* * * * *

UNITED STATES PATENT AND TRADEMARK OFFICE
CERTIFICATE OF CORRECTION

PATENT NO. : 4,910,724

DATED : March 20, 1990

INVENTOR(S) : Wataru Sakagami, et al.

It is certified that error appears in the above-identified patent and that said Letters Patent is hereby corrected as shown below:

COLUMN 1

Line 2, "continuation-in-part" should be deleted.
    Line 20, "cardshaped" should read --card-shaped--.
    Line 28, "directly" should read --directory--.
    Line 62, "on to" should read --onto--.

COLUMN 3

Line 11, "directory areas 2-24," should read --directory areas 21-24,--.

COLUMN 4

Line 65, "form" should read --from--.

Signed and Sealed this

Seventeenth Day of September, 1991

Attest:

HARRY F. MANBECK, JR.

*Attesting Officer*      *Commissioner of Patents and Trademarks*